(12) United States Patent
Wuellner (10) Patent No.: US 11,955,831 B2
(45) Date of Patent: Apr. 9, 2024

(54) PHOTOVOLTAIC SOURCES POWER STATION WITH INTEGRATED BATTERY CHARGE/DISCHARGE CYCLE

(71) Applicant: Paladin Power Inc., Murrieta, CA (US)

(72) Inventor: Klaus Wuellner, San Jose, CA (US)

(73) Assignee: Paladin Power, Inc., CA (US)

( * ) Notice: Subject to any disclaimer, the term of this patent is extended or adjusted under 35 U.S.C. 154(b) by 281 days.

(21) Appl. No.: 16/095,496

(22) PCT Filed: Apr. 20, 2017

(86) PCT No.: PCT/US2017/028533
§ 371 (c)(1),
(2) Date: Oct. 22, 2018

(87) PCT Pub. No.: WO2017/184822
PCT Pub. Date: Oct. 26, 2017

(65) Prior Publication Data
US 2019/0089163 A1    Mar. 21, 2019

Related U.S. Application Data

(60) Provisional application No. 62/325,167, filed on Apr. 20, 2016.

(51) Int. Cl.
*H02J 7/35* (2006.01)
*G05F 1/67* (2006.01)
(Continued)

(52) U.S. Cl.
CPC .................. *H02J 7/35* (2013.01); *G05F 1/67* (2013.01); *H02J 3/381* (2013.01); *H02J 7/0068* (2013.01); *H02J 9/002* (2013.01); *H02S 10/00* (2013.01); *H02J 2300/24* (2020.01); *H02J 2300/26* (2020.01); *Y02E 10/56* (2013.01)

(58) Field of Classification Search
CPC .......... H02J 3/385; H02J 3/383; H02J 7/0068; H02J 7/35; H02J 9/002; G05F 1/67; H02S 10/00; Y02E 10/56
See application file for complete search history.

(56) References Cited

U.S. PATENT DOCUMENTS

| | | | |
|---|---|---|---|
| 5,929,538 A * | 7/1999 | O'Sullivan | H02J 7/34 307/64 |
| 9,559,521 B1 * | 1/2017 | King | H02J 9/06 |

(Continued)

*Primary Examiner* — Tomi Skibinski
(74) *Attorney, Agent, or Firm* — Dentons Cohen & Grigsby P.C.

(57) ABSTRACT

An integrated power control system for transferring electric power from a photovoltaic source through a power module to a transfer switch and/or a storage battery. A monitoring system includes external current sensors that control connection of the transfer switch to a utility distribution network. Electrical energy that is generated by the photovoltaic source is directed to a load and a lithium-ion storage battery according to the level of photovoltaic power generated and according to the load demand. At times when the photovoltaic energy is greater than the load demand and the charge level of the battery is at full capacity, excess energy is directed to the electrical distribution grid. In case of grid outage, energy is drawn from the battery to maintain electric supply for designated loads.

26 Claims, 3 Drawing Sheets

(51) Int. Cl.
*H02J 3/38* (2006.01)
*H02J 7/00* (2006.01)
*H02J 9/00* (2006.01)
*H02S 10/00* (2014.01)

(56) References Cited

U.S. PATENT DOCUMENTS

| | | | |
|---|---|---|---|
| 9,728,978 B2* | 8/2017 | Dibachi | H02J 4/00 |
| 2008/0150484 A1* | 6/2008 | Kimball | H02J 7/345 |
| | | | 320/125 |
| 2011/0298288 A1* | 12/2011 | Cho | H01M 10/465 |
| | | | 307/70 |
| 2011/0304295 A1 | 12/2011 | McNally | |
| 2012/0049635 A1 | 3/2012 | Schelenz et al. | |
| 2012/0205985 A1 | 8/2012 | Inakagata | |
| 2012/0267957 A1 | 10/2012 | Czarnecki | |
| 2013/0043723 A1* | 2/2013 | Daniels | H02J 3/383 |
| | | | 307/23 |
| 2013/0207473 A1* | 8/2013 | Jain | H02J 9/06 |
| | | | 307/65 |
| 2014/0015324 A1* | 1/2014 | Brennan | H02J 3/381 |
| | | | 307/72 |
| 2014/0117756 A1* | 5/2014 | Takahashi | H02J 7/35 |
| | | | 307/23 |
| 2015/0022004 A1* | 1/2015 | Okuda | H02J 3/32 |
| | | | 307/66 |
| 2015/0145328 A1* | 5/2015 | Ohshima | H02J 3/381 |
| | | | 307/22 |
| 2015/0155720 A1* | 6/2015 | Mise | H02J 7/0014 |
| | | | 320/107 |
| 2016/0241057 A1* | 8/2016 | Yang | H02J 9/062 |
| 2017/0288413 A1* | 10/2017 | Varadarajan | H02J 7/007 |

* cited by examiner

PHOTOVOLTAIC SOURCES POWER STATION WITH INTEGRATED BATTERY CHARGE/DISCHARGE CYCLE

BACKGROUND OF THE INVENTION

Field of Invention

The presently disclosed invention relates to photovoltaic power stations ("PV power stations") and, more particularly, PV power stations with capability for storing electrical energy, supplying electrical energy to a load, and supplying electrical energy to a distribution grid.

Discussion of the Prior Art

Electrical systems for converting solar radiation to electrical energy are known in the art. Essentially, such systems comprise an array of multiple photovoltaic ("PV") cells or panels that are electrically connected together so as to provide electrical the cells or panels are illuminated by solar energy. Often, the electrical energy that is generated from the solar panels is stored in a battery or may be transmitted to the electrical power distribution grid through an inverter.

In the prior art, PV power generating systems have had several inherent shortcomings and disadvantages. For example, the generated power is limited, in part, in proportion to the intensity of the solar radiation and by the efficiency of the PV module design. Often, PV power stations are not sized to generate sufficient power to directly serve the intended load, such as a household, in real-time and during times of peak demand. Moreover, such systems provide power only at times when the solar panel array is illuminated by solar radiation. Thus, no electrical power is available from PV systems at night and only limited power is available during times when sunlight intensity is relatively low.

To overcome these difficulties, PV electrical systems are generally connected to the electrical distribution grid of an electric utility. In that way, the electrical power generated by the PV system rates can be augmented by electrical power drawn from the distribution grid. In those cases, when electrical power generated by the PV array exceeds the electrical power demand, the excess power is sometimes fed to the distribution grid.

It was seen that prior PV power systems could be more efficient if they were capable of storing energy at times when the generated power exceeded the demand and if they could draw on the distribution grid at times when generated power in combination with delivery of stored power was insufficient to meet the demand. Efficiencies could be improved by limiting transmission of electrical power. In addition, reliability could be improved by augmenting the real-time power generated by the PV modules with energy that was automatically, locally stored so as to modify the effect of variability of solar illumination and differences in power demand by the load.

It was also seen that a PV power station would be advantageous if it could reduce the user's reliance on the power distribution grid. The cost of electrical power delivered over the grid has been seen to rise over time. Also, due to the monopolistic nature of electrical generation and distribution by utilities, a consumer has limited ability to negotiate more favorable usage rates. Also, it has been observed that the heavy utilization and age of the distribution grid give cause for concern. The components of the distribution grid are stressed and have tended to fail, especially during periods of peak delivery when they are most needed. This leaves the consumer wholly dependent on distribution grid that is prone to service interruptions that are annoying and even create safety hazards.

For all of the forgoing reasons, mechanisms that would reduce the degree of dependence on the electrical distribution grid have increasingly been seen as economically and practically advantageous.

SUMMARY OF THE INVENTION

The presently disclosed power station operates in a mains-interactive mode while connected to an active distribution grid or when the distribution grid is out of service and the power station operates in stand-alone mode in which it is disconnected from the electrical distribution grid. At times when the power station is connected to an active distribution grid, the disclosed power station uses photovoltaic-generated power to off-set power demand from a load. When the photovoltaic power is greater than the power demand of the load, the excess power is stored in a battery or, if the battery is at storage capacity, the excess power is sent to the distribution grid. If photovoltaic power is being generated, but it is less than the power demand of the load, the power shortfall is drawn from the battery unless the battery charge is less than a threshold level. When the battery charge is less than the threshold level but greater than a minimum level, photovoltaic power that is generated is used to off-set power demand from the load, but any shortfall of the power demand from the load is made up from the distribution network, not the battery. If the charge level of the battery falls below a minimum level, all photovoltaic generated power that is generated is stored in the battery until the battery charge level is above the minimum level. Using this hierarchy of charge levels of the battery and the level of photovoltaic generated power in relation to the power demand of the load establishes a cycle for charging and discharging the battery while maintaining electric production from the power station.

At times when the distribution grid associated with the power station is out-of-service, the power station automatically disconnects from the grid and operates in stand-alone mode on power that is either generated from a photovoltaic source or drawn from the battery. In this mode, photovoltaic generated power is used first to satisfy or partially-satisfy the power demand of the load. If the photovoltaic generated power is less than the power demand of the load, additional power is drawn from the battery to the extent it is available.

It has been found that the mains-interactive mode and the stand-alone mode provide a power station that simplifies the use of photovoltaic generated power and improves the reliability of using photovoltaic power sources irrespective of simultaneous solar illumination while also significantly reducing grid load.

In either the mains-interactive mode or the stand-alone mode, limits on the charge level of the battery may be set to preserve battery life and to maximize efficiency. Also, in either mode the photovoltaic-generated power and the stored batter power is converted from DC power to AC power through power modules that include inverters. Electrical current that would flow from the grid to connected loads such as electrical appliances is offset (brought to zero) by the same amount of (inverter) current that is fed into the grid connection node. In this way, the disclosed power station reduces grid burden and increases the overall efficiency of the photovoltaic installation by reducing grid losses and other losses arising out of the transmission and storage of electric power.

Preferably, components of the disclosed system and method are located in a single electrical enclosure. The integration of the method and system herein described into a single physical unit are not known in the prior art.

Other embodiments and features of the presently disclosed invention will become apparent to those skilled in the art as a description of a presently preferred embodiment proceeds.

DESCRIPTION OF A PRESENTLY PREFERRED EMBODIMENT

In the presently disclosed invention, a power station optimizes use of electric power produced from a photovoltaic source such as an array of photovoltaic solar panels to power devices such as electric household appliances that consume electric power. Such devices are generally referred to herein as "electric loads" or sometimes merely "loads." While residential loads are depicted in the example of the preferred embodiment, the disclosed power station is also useful with commercial and/or industrial loads.

Due to the diurnal nature of solar power, the power station operates in conjunction with an electrical power distribution grid that is supported by electric utilities throughout the country. However, the power station is capable of several operating modes. The power distribution grid has a high degree of reliability so that, in most cases, the power station operates in a "mains-interactive" mode wherein the power station is coupled to the electric distribution grid while the grid is serviceable. However, the disclosed power station also provides for instances when the power distribution grid is out of service and power station decouples from it to operate in "stand-alone" mode.

In the mains-interactive mode of the power station, an inverter converts DC power from the photovoltaic source to AC power. The converted energy from the inverter is then injected into the power grid to balance against electric power that the load consumes. Under certain cycle conditions, when the power generated by the photovoltaic source is greater than the power that the load consumes, the excess power may be delivered to a battery for storage. The power station balances converted energy against energy consumed by the load in real-time so that the disclosed power station affords improved efficiency by limiting the transmission and storage of energy.

Figure 1:
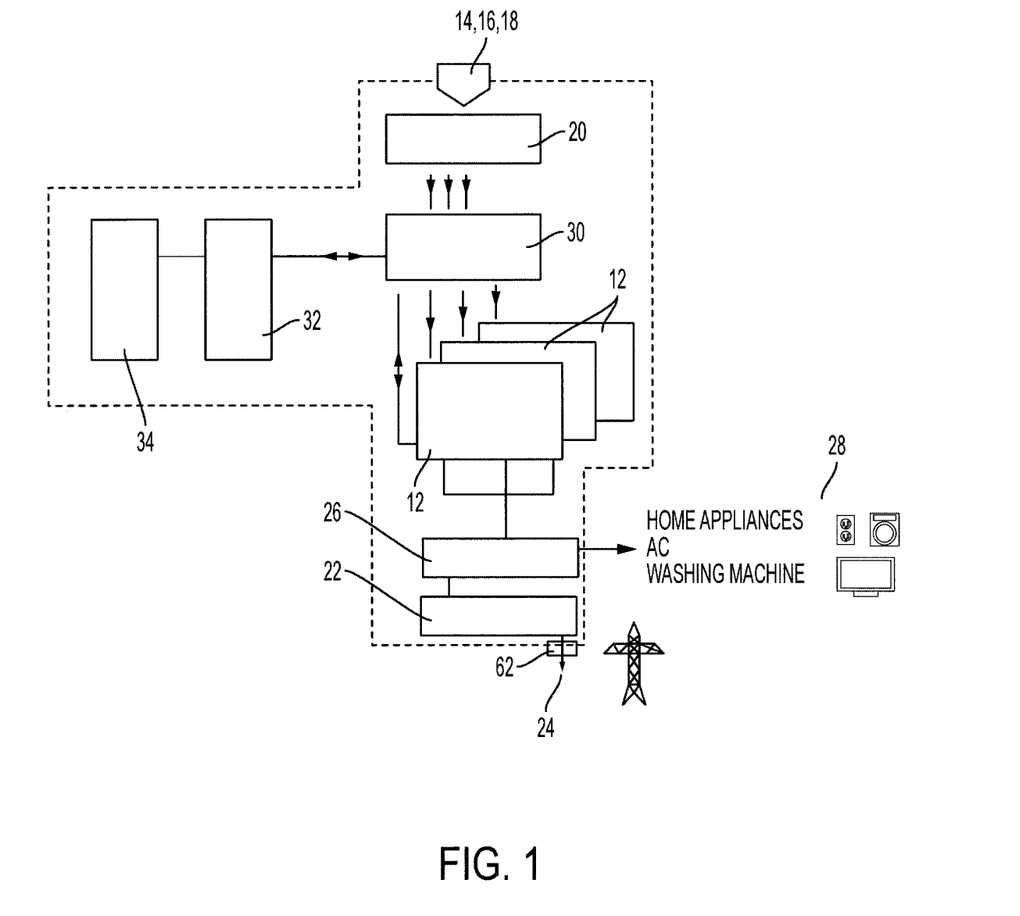
FIG. 1 is a system layout of the disclosed power station.

A presently preferred embodiment of the disclosed power station is shown and described in connection with FIGS. 1-3. Referring particularly to FIGS. 1 and 3, the disclosed power station is an integrated device that is housed in an enclosure 10. Each enclosure may include up to three power modules 12 that may be connected in parallel to accommodate respective photovoltaic sources such as linear arrays of solar panels 14, 16 and 18. Power modules 12 are scalable and may be connected in parallel to increase the total output power of the power station as appropriate to the economies of the particular application. Each power module 12 may include monitoring firmware that is directed to parallel electrical connection for the power modules.

FIGS. 1 and 3 further depict disconnect switches 20 and 22 for controlled connection to the photovoltaic ("PV") source and to the utility distribution network. A load transfer switch 26 that is electrically connected to the power modules 12 also includes terminals for selectively connecting to the electrical load 28 and the utility distribution network 24 through the disconnect switch 22. Transfer switch 26 may be a power contactor that has a multifunctional contact set. In addition, a ground fault detector-interrupter (GFDI) is interposed between the power modules 12 and a storage battery 32 and also between the power modules 12 and the solar panel arrays 14-18.

Preferably, battery 32 is a lithium-ion-phosphate battery. As hereafter more fully explained, battery 32 stores or delivers the difference in energy between photovoltaic power that is generated by the photovoltaic source ("the PV Harvest") and the electric power that is consumed by the load ("the Demand"). In addition, battery 32 may provide an energy source or accept energy storage during stand-alone operation of the power station.

FIGS. 1 and 3 also show a battery monitoring system 34. During cyclic discharging and recharging of battery 32, battery monitoring system 34 increases battery life and improves battery safety by limiting charging and discharge voltages. Battery monitoring system 34 also monitors the state of charge of battery 32, the single cell temperature of battery 32, and the battery disconnection contactor 30. In embodiments, battery monitoring system 34 may be included in a battery enclosure that is separate from enclosure 10.

Operational software cooperates with a controller to optimize balancing of power consumption by the load. Such software controls the inverter grid feed-in current to compensate demand current of the load through the use of external current sensors. The software also provides a power back-up function that is later described herein.

Energy flow in the power station depends on the instantaneously available photovoltaic input power and real-time metering by a grid sensor 62. The system control unit cooperates with grid sensor 62 to monitor and control power modules 12 and also to monitor and control the battery charge process. They also afford remote grid voltage sensing and grid current sensing and provide control of power flow and backup operation in the event of grid outage.

The power station further includes a control circuit such as controlled area network bus controller ("a CAN-bus controller") of the known type used as communication field bus. The CAN-bus controller affords remote monitoring and control of the power station through a designated controlled area network ("CAN") master module and Ethernet/internet communication such as through a smartphone. The CAN-bus controller is connected to battery monitoring system 34 to support monitoring battery conditions that are acquired by the battery monitoring system.

Figure 2:
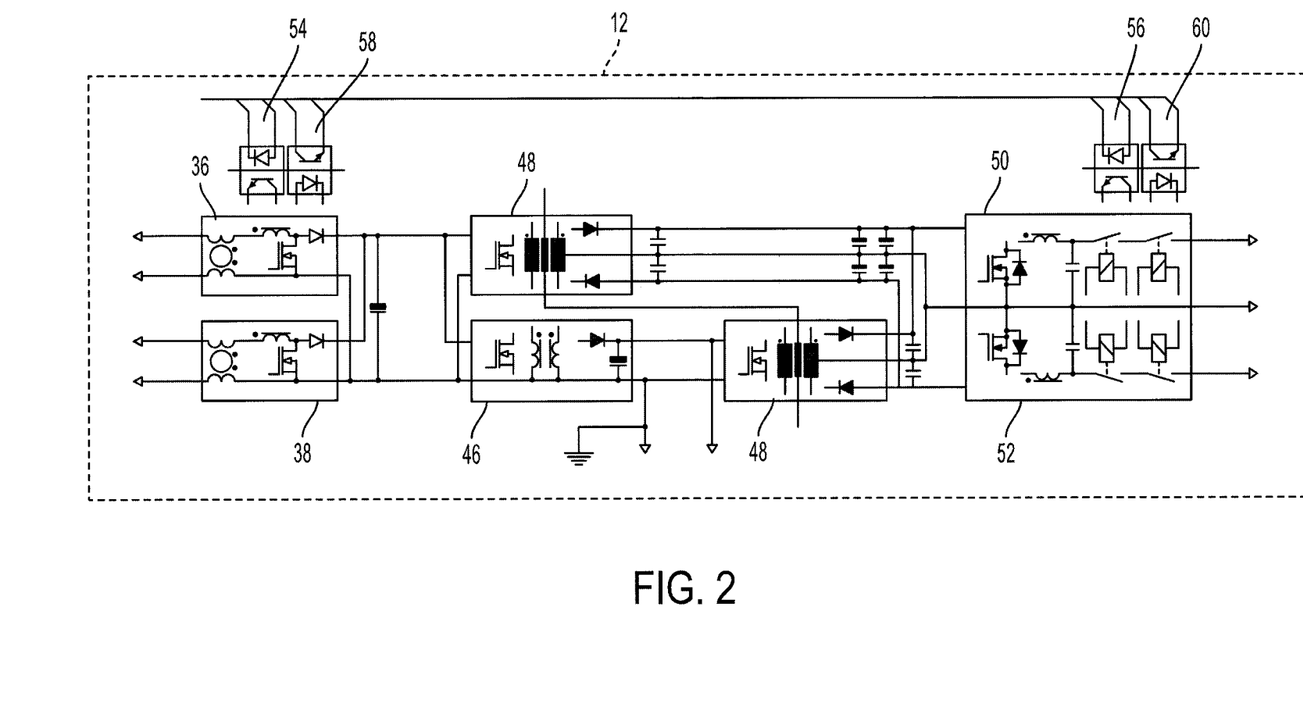
FIG. 2 is a schematic drawing of the power module that is included in the disclosed power station.
Figure 3:
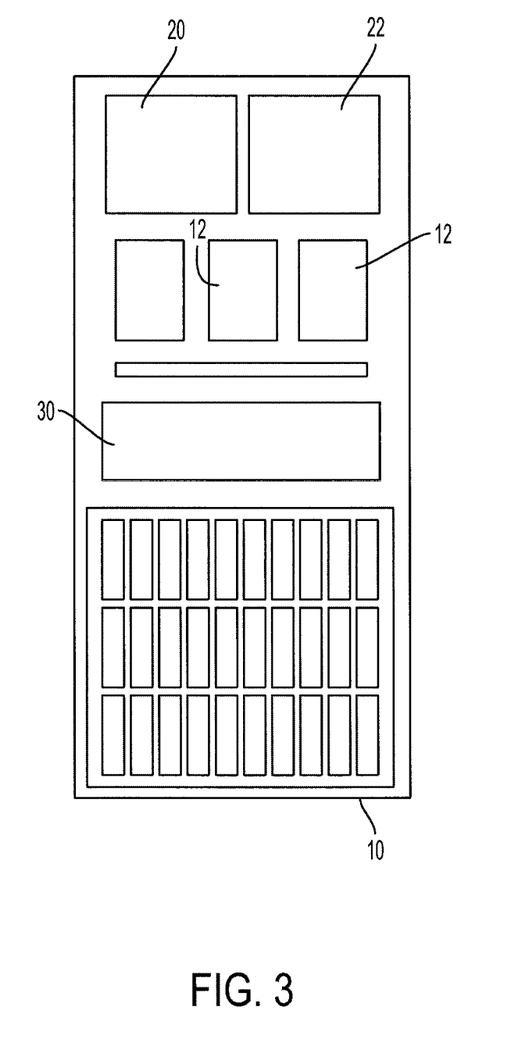
FIG. 3 is an illustration of the physical arrangement of the elements of a preferred embodiment of the disclosed power station.

FIG. 2 is a functional diagram of the details of power modules 12. Each power module 12 receives input power from a respective solar panel array 14-18. Each power module 12 includes circuitry for two maximum power point tracking circuits ("MPPT circuits") 36 and 38 for two independent photovoltaic inputs. In the example of the preferred embodiment, MPPT circuits 36, 38 work on one common DC link (#1) with a nominal voltage of 470 VDC and a maximum voltage, related to the maximum input voltage, of 500 VDC.

As known in the art, MPPTs 36 and 38 are electronic DC to DC converters that optimize the match between the solar arrays 14-18, battery 32, and utility distribution network or grid 24. Such matching maximizes the energy available from solar panel arrays 14-18 throughout operation of the power station. The voltage at which solar panel arrays 14-18 produce maximum power is sometimes referred to as "the maximum power point" or "the peak power voltage."

Each power module 12 further includes a battery charge controller 46 for lithium-ion phosphate battery 32. In the example of the preferred embodiment, battery 32 may have a rated voltage of 96V. DC link (#1) supplies battery charge controller 46 and an isolating DC-DC converter 48.

Each power module 12 also includes hybrid inverters 50, 52 that satisfy both grid-interactive and stand-alone operation modes of the power station. Hybrid inverters 50, 52 convert the variable direct current (DC) output of the solar panel arrays 14-18 to a utility frequency alternating current (AC) that can be fed into a commercial electrical grid or into a local, off-grid electrical network that supplies designated loads. DC-DC converter 48 supplies hybrid inverter stages 50, 52 for phase 1 and 2 with DC link (#2). In an example, DC link (#2) may have a nominal voltage of +/−200 VDC with the maximum voltage on DC link #2 electronically limited to +/−240 VDC. Preferably, inverters 50, 52 include output overcurrent protection that has internal electronic current limiting and 2-pole magnetic circuit breakers in each inverter output circuit.

In each power module 12, both hybrid inverter stages 50, 52 are simultaneously disconnected from the main connections through four independently controlled relays 54-60. Relays 54-60 ensure disconnection from grid 24 to provide "anti-islanding" or in the event of inverter failure. "Anti-islanding" refers to the capability of an inverter to sense a power outage on the distribution network 24 and shut itself down to stop the production of electricity.

Each power module 12 has two independent isolated CAN nodes, one on the dual MPPT unit 36, 38 and one on the hybrid inverter 50, 52. This ensures monitoring and control of both the MPPT units 36, 38 and the hybrid inverters 50, 52 through the CAN-bus controller.

Operation of the power station is first explained with respect to conditions wherein the power station is connected to an active utility distribution network that maintains electric voltage on the network. Under such operating conditions, the utility disconnect switch 22 is closed and the load transfer switch is also closed to provide an electrical connection between the power modules 12 and the utility distribution network 24 and between the power modules 12 and the load 28 through the load terminal of the load transfer switch 26. Under these conditions, if solar energy illuminates the solar panel arrays 14-18, DC power is conducted to the power modules 12 where the DC power is converted to AC power. AC power is then passed through the load transfer switch 26 to balance the power demand of the load 28 in real time. When battery 32 has a given charge level (which may be more than 50% of the nominal capacity), the power modules feed exactly the amount of energy into the grid to compensate the instantaneous power demand of load 28.

At times when the power generated by the power modules 12 exceeds the power demand of load 28, the battery monitoring system 34 monitors the charge level of battery 32 to send the excess energy either to the battery 32 or to the utility distribution network 24. If the charge level of the battery is at the maximum level, the excess energy is sent to the distribution network 24. Otherwise, the charge level of the battery is below the maximum level for the battery and the excess energy is sent to battery 32 and stored.

At times when the power generated by power modules 12 is less than the power demand of load 28, the power source to satisfy the difference in power again depends on the charge level of the battery. If the charge level of the battery is above a threshold level, then the needed power is drawn from battery 32. The threshold level is a predetermined level that is based, in part, on the service factor for the battery. For example, the threshold level may be selected such that the battery is not discharged to a very low level because such use would impair the useful life of the battery. It has been found that degradation of the effective battery capacity depends mainly on the number of charge/discharge cycles in combination with the depth of discharge. To extend battery life, the discharge process can be limited to 70% of a given depth of discharge. Also, consideration is given to reasonable amounts of energy that should be maintained in the battery in the event of emergency conditions. A typical charge level for the threshold level may be 60% of the fully rated charge.

If the charge level of the battery is below the threshold level, but still greater than a minimum charge level, then the needed power is drawn from the distribution network 24. The minimum charge level is determined according to the need for an energy reserve in the event of an outage of the utility distribution network 24—either during the day when the solar panel array 14-18 is capable of generating power or at night when no power from solar panel array 14-18 will be available. A typical level of the minimum charge may be 20% of the fully rated charge.

At times when the charge level of the battery is less than the minimum level, all energy generated by the solar panel array 14-18 is sent to battery 32 for storage and the load is powered from the utility distribution network 24 without real-time balancing of the power demand from power modules 12.

The above-described hierarchy for power distribution can be made subject to certain exceptions and the discretion of the user. For example, if the power demand by the load during load peaks is greater than the power generated from the inverters, then the additional needed power may be drawn from the battery. This rule enables the power station to cut all power peaks using stored battery power.

It can be seen that the above-described hierarchy for cycling power to and from the battery can be related to typical circumstances for a residential user during a 24-hour period. For example, during late morning and early afternoon, residential power demand tends to be lower and, assuming full solar illumination, PV production from solar panel array 14-18 will tend to be at its greatest. At those times, the power station charges battery 32 while the power station is self-sufficient to satisfy power to the load from the power modules 12. If battery 32 becomes 100% charged, power is sent to the electrical distribution grid.

In the late afternoon and early evening, circumstances for a typical residential user have likely changed. At those times, the solar power produced tends to have decreased while the demand from the load tends to have increased so that the power generated by the power modules 12 is less than the power demand of the load 28. During this phase, while the charge level of battery 32 remains above the threshold level, the shortfall of energy from the power modules 12 that is needed to balance the energy drawn by load 28 is drawn from battery 32.

In the evening when there is no solar illumination, the power modules 12 produce no power. However, the power station continues to operate with the inverter in the utility-interactive mode so that the power station draws power from battery 32 until the charge level of the battery falls to the predetermined minimum level (e.g. 15-20% of rated capacity). After that, the energy needed to supply the load demand is drawn from the public distribution network. Stopping the draw of power from battery 32 at the minimum charge level retains a residual level of power in battery 32 in case the distribution network fails during the night.

The above explanation of the power station assumes that the utility distribution network 24 remains active with voltage available from that network. During periods of utility failure, the power station works in emergency power mode to provide electrical power to selected loads from the inverter operating in stand-alone mode. The emergency power mode starts automatically if power on the grid fails for more than a given time period—e.g. 10 seconds. In that case, all of the power circuits that are connected to emergency power are powered independent of the utility. The time that emergency power is available depends on the charge level of the battery at the inception of the emergency power condition, the energy demand during the period of emergency power, and the available PV energy during the period of emergency power.

In the event that utility distribution network 24 fails, transfer switch 26 automatically disconnects load 28 from the distribution grid 24. The power station has an emergency power circuit that is connected to the mains when utility power is available through the distribution network. When a grid failure occurs, the grid connection is separated from the emergency power output and the power modules that had been running in mains interactive mode are re-started in stand-alone mode with the neutral conductor of the emergency power output grounded.

After power modules 12 change to stand-alone mode, they supply power load 28 until battery 32 becomes fully discharged. In this mode, the battery discharge may be limited to 90 VDC to protect battery 32 against deep discharge. If the solar panel array 14-18 collects PV energy during this mode, the power is sent to the power modules 12 and load 28. If the solar panel array 14-18 collects PV energy in excess of that demanded by load 28 during this mode, the excess energy is sent to battery 32. When power is restored to the distribution grid, the power station automatically returns to utility-interactive mode.

The presently disclosed invention includes other embodiments that will be apparent to those skilled in the art and are included in the scope of the following claims.

I claim:

1. A power station that selectively transfers electrical power Roma photovoltaic source ma electrical load, an electric power distribution network, and a storage battery in accordance with the power level generated by the photovoltaic source relative to the power level required by the electrical load, said power station comprising:
   - at least one maximum power point (MPP) tracker that is connected to said photovoltaic source;
   - an inverter that is electrically connected to said at least one maximum power point tracker and to said storage battery such that said inverter is responsive to electrical power from said at least one power point tracker and also responsive to electrical power from said storage battery, said inverter converting direct current to alternating current and also converting alternating current to direct current;
   - a controller that is in electrical communication with said storage battery, with said at least one maximum power point tracker, and with said inverter, said controller governing electrical current flow from said at least one maximum power point tracker to said storage battery and also governing electrical current flow from said storage battery to said inverter;
   - a transfer switch that is electrically connected to said inverter, said transfer switch having a first set of terminals that are electrically connected to said electrical load and a second set of terminals that are electrically connected to said electric power distribution network, said transfer switch having a first position wherein said inverter is electrically connected to said electrical load through said first set of terminals, said transfer switch also having a second position wherein said inverter is electrically connected to said electrical power distribution network through said second set of terminals; and
   - a control circuit that is responsive to the level of electrical power stored in said storage battery, said control circuit causing said transfer switch to locate in said first position wherein said transfer switch completes an electrical connection between said inverter and said first set of terminals of said transfer switch, or to locate in said second position wherein said transfer switch completes an electrical connection between said inverter and said second set of terminals of said transfer switch, and control circuit controlling the position of said transfer switch between said first and second positions in accordance with the level of electrical power stored in said storage battery, and in accordance with the level of electrical power generated from said at least one power point tracker relative to the power demand of said electrical load.

2. The power station of claim 1 wherein, at times when said distribution network maintains an electric voltage, the energy stored in said battery is greater than a first predetermined minimum level and less than a second predetermined threshold level that is greater than said first predetermined minimum level, and the power generated by said photovoltaic source is greater than the power demand of said load, the power from said inverter in excess of said power demand of said load is conveyed to said battery.

3. The power station of claim 1 wherein, at times when said distribution network maintains an electrical voltage and the energy generated by said photovoltaic source is less than the power demand of said load, the power demand of said load in excess of said power generated by said photovoltaic source is drawn from said battery.

4. The power station of claim 1 wherein, at times when said distribution network maintains an electric voltage and said battery is charged to full nominal capacity, said inverter provides power generated by said photovoltaic source in the amount of the power demand of said load to said load and power in excess of the power demand of said load is conducted to said distribution network.

5. The power station of claim 1 wherein said control circuit causes said inverter to conduct power from said battery to said load during peaks of load power demand.

6. The power station of claim 1 wherein, at times that said photovoltaic source provides no electric power and the energy stored in said battery is greater than said first predetermined level, all of said power demand of said load is drawn from said battery.

7. The power station of claim 1 wherein, at times when said distribution network maintains an electric voltage and the electrical energy stored in said battery is less than said predetermined minimum threshold, and when said inverter receives no electrical power from said photovoltaic source, all of said power demand of said load is drawn from said distribution grid.

8. The power station of claim 1 wherein, at times when said distribution network does not maintain an electric voltage and the energy stored in said battery is greater than said first predetermined minimum level, said control circuit causes said transfer switch to disconnect from the distribution network such that power to said load is supplied by from said inverter in combination with said battery.

9. The power station of claim 8 wherein said control circuit causes said transfer switch to connect to the distribution network at times when said distribution network maintains electrical voltage.

10. The power station of claim 1 wherein said power from said inverter that is in excess of the power demand of said load is supplied to said battery.

11. A power station having a photovoltaic input terminal that is connectable to a photovoltaic array, said power station selectively making electrical connections with said photovoltaic input terminal and a power distribution network terminal according to electric power availability from said power distribution network and electric power demands of an electric load, said power station comprising:
    a battery that is in electrical communication with said photovoltaic terminal, said battery receiving energy from said photovoltaic input terminal at times when the energy demand of said electric is less than the energy generated by said photovoltaic array;
    an inverter that is electrically connected to a first maximum power point (MPP) tracker and a second MPP tracker said first MPP tracker and said second MPP tracker being connected to said inverter in electrical parallel such that said inverter is responsive to electrical power from at least one of said first power point tracker and said second power point tracker, said inverter also being electrically connected to said battery such that said inverter is also responsive to electrical power from said battery, said inverter converting direct current to alternating current and also converting alternating current to direct current;
    a controller that is in electrical communication with said battery and with said first MPP tracker and with said second MPP tracker, and with said inverter, said controller governing electrical current flow to said battery, the controller also being coupled to said inverter and governing electrical current flow from said battery to said inverter;
    a transfer switch that is electrically connected to said inverter, said transfer switch having a first set of terminals that are eclectically connected to said electrical load terminals and a second set of terminals that are eclectically connected to said electric power distribution network, said transfer switch having a first position wherein said inverter is electrically connected to said electrical load through said first set of terminals, said transfer switch also having a second position wherein said inverter is electrically connected to said electrical power distribution network through said second set of terminals; and
    a control circuit that monitors the level of electrical power stored in said battery, said control circuit causing said transfer switch to selectively complete an electrical connection between said inverter and said load and between said inverter and said distribution network in accordance with the level of electric power stored in said battery in combination with the electric power provided by said photovoltaic source in relation to the power demand of said load.

12. The power station of claim 11 wherein said control circuit causes said transfer switch to connect said load to said inverter at times when the energy stored in said battery is above a predetermined threshold level.

13. The power station of claim 12 wherein energy from said photovoltaic source flows to said battery at times when said energy from said photovoltaic source is greater than the power demand of said load.

14. The power station of claim 12 wherein energy to said load flows from said battery at times when said energy from said photovoltaic source is less than the power demand of said load.

15. The power station of claim 11 wherein said control circuit causes said transfer switch to connect said distribution network to said inverter at times when said battery is charged to a predetermined maximum capacity and the electrical power demand of said load is less than the electrical power generated by said photovoltaic source.

16. The power station of claim 11 wherein said control circuit causes said transfer switch to connect said load to both said inverter and said distribution network at times when the charge level of said battery is less than a predetermined minimum threshold level.

17. The power station of claim 11 wherein said control circuit causes said transfer switch to connect said load to said distribution network at times when the power demand of said load is greater than the power generated by said photovoltaic source and the charge level of said battery is greater than a predetermined minimum level and less than a predetermined threshold level that is greater than the predetermined minimum level.

18. The power station of claim 11 wherein said control circuit causes said transfer switch to disconnect from said distribution network at times when said electrical power is not available on said distribution network.

19. A power station that includes a power module, a load terminal, and an electrical distribution network terminal, and having capability for energy storage and for conversion between direct current and alternating current, said power station controlling energy flow according to power generated by a photovoltaic source and the metering of a grid sensor, said power station receiving power from said photovoltaic source and selectively making electrical connections among said power module, said load terminal and said electrical distribution network according to the charge level of said storage battery, electric power available from said photovoltaic source and electrical power demands of said load, said power station comprising:
    a power module that includes at least one maximum-power-point tracking converter, a battery charge controller that is connected to the maximum-power-point tracking converter, and a hybrid inverter with anti-islanding protection;
    an emergency power by-pass contactor that connects said load to said inverter at times when electrical power is unavailable from said electrical distribution network;
    a control unit that provides system control and central 60 Hz phase synchronization at times when power is unavailable from said electrical distribution network;
    a grid sensor that includes an 1v1E power supply, said grid sensor monitoring two grid phases in real-time for metering voltage, current and energy flow, said grid sensor avoiding islanding and also initiating backup emergency power mode for the power station, said grid sensor also metering power for controlling the hybrid inverter for load demand; and a battery that is connected to said power module, said battery storing energy at times when power from the photovoltaic source exceeds the load demand.

20. The power station of claim 19 wherein, at times when the charge level of said battery is greater than a selected minimum level but less than a selected threshold level that is greater than said minimum level, said control circuit causing said power station to supply energy to the battery at times when the energy demand at said load terminal is less than the power generated by said photovoltaic source.

21. The power station of claim 20 wherein, when power generated by said photovoltaic source exceeds the demand at said load terminal, the excess energy is stored in said battery.

22. The power station of claim 20 wherein, at times when the charge level of said battery is greater than a maximum level that is greater than said threshold level said power station supplies power to the distribution network terminal at times when the power generated by the photovoltaic source is greater than the load demand and draws energy from the battery at times when the power generated by the photovoltaic source is less than the load demand.

23. The power station of claim 19 wherein, at times when the charge level of said battery is greater than a selected minimum level, but less than a threshold level that is greater than the minimum level, said control circuit causing said power station to supply energy to the battery when power generated by said photovoltaic source is greater than the load demand and to draw energy from the distribution network when the power generated by said photovoltaic source is less than the load demand.

24. The power station of claim 19 wherein, at times when the charge level of said battery is less than said minimum level of the battery, said power station supplies power only to said storage battery.

25. The power station of claim 19 wherein, at times when the instantaneous energy of said load demand is greater than the power generated by the photovoltaic source, said power module draws DC power from said battery and supplies AC power to said load.

26. The power station of claim 19 wherein, at times when there is no power generated by the photovoltaic source and the charge level of said battery is greater than said minimum threshold level, the power station draws energy only from said battery and supplies that energy to said load.

* * * * *